United States Patent [19]
Hermanns

[11] Patent Number: 4,651,847
[45] Date of Patent: Mar. 24, 1987

[54] TORQUE LIMITING DEVICE

[75] Inventor: Martin J. Hermanns, Ft. Wayne, Ind.

[73] Assignee: Dana Corporation, Toledo, Ohio

[21] Appl. No.: 570,273

[22] Filed: Jan. 12, 1984

[51] Int. Cl.⁴ .................. B60K 17/354; B60K 17/344
[52] U.S. Cl. .................................... 180/245; 180/248
[58] Field of Search ............................... 180/248, 245

[56] References Cited
U.S. PATENT DOCUMENTS

| | | |
|---|---|---|
| 865,486 | 9/1907 | Gannon . |
| 1,201,232 | 10/1916 | Archer ................................. 180/246 |
| 1,274,722 | 8/1918 | Lacey ....................................... 64/29 |
| 1,968,618 | 7/1934 | Padgett et al. . |
| 2,164,870 | 7/1939 | DeSalardi . |
| 2,185,636 | 1/1940 | Kysor . |
| 2,459,092 | 1/1949 | Peterson et al. . |
| 3,149,505 | 9/1964 | Burkhalter et al. . |
| 3,605,523 | 9/1971 | O'Brien ................................. 74/711 |
| 3,650,349 | 3/1972 | Cleveland et al. ..................... 180/44 |
| 3,688,522 | 9/1972 | Schmuck ................................. 64/29 |
| 4,119,168 | 10/1978 | Fogelberg ............................ 180/248 |
| 4,493,387 | 1/1985 | Lake et al. ........................... 180/248 |

FOREIGN PATENT DOCUMENTS

| | | |
|---|---|---|
| 770922 | 3/1957 | United Kingdom . |
| 1065130 | 4/1967 | United Kingdom . |
| 1256829 | 12/1971 | United Kingdom . |
| 1380604 | 1/1975 | United Kingdom . |
| 1447875 | 9/1976 | United Kingdom . |

OTHER PUBLICATIONS

*Automobile International*, International Mechanic Course Lesson 10, Dec., 1973.
*Auto Mechanics and Diesel National Schools*, Lesson No. 71, 12/1955.
Spicer Carrier Type Automotive Axles, 12/1965.

Primary Examiner—Carlton R. Croyle
Assistant Examiner—Theodore W. Olds
Attorney, Agent, or Firm—Emch, Schaffer, Schaub & Porcello Co.

[57] ABSTRACT

The present invention is an improved torque transfer assembly for use in four-wheel drive vehicles. The assembly comprises the use of a gear located in communication with the auxiliary drive axle assembly which is designed to slip, upon application of an overload torque, to prevent excessive torque windup and shock-loading on the auxiliary drive axle assembly.

9 Claims, 5 Drawing Figures

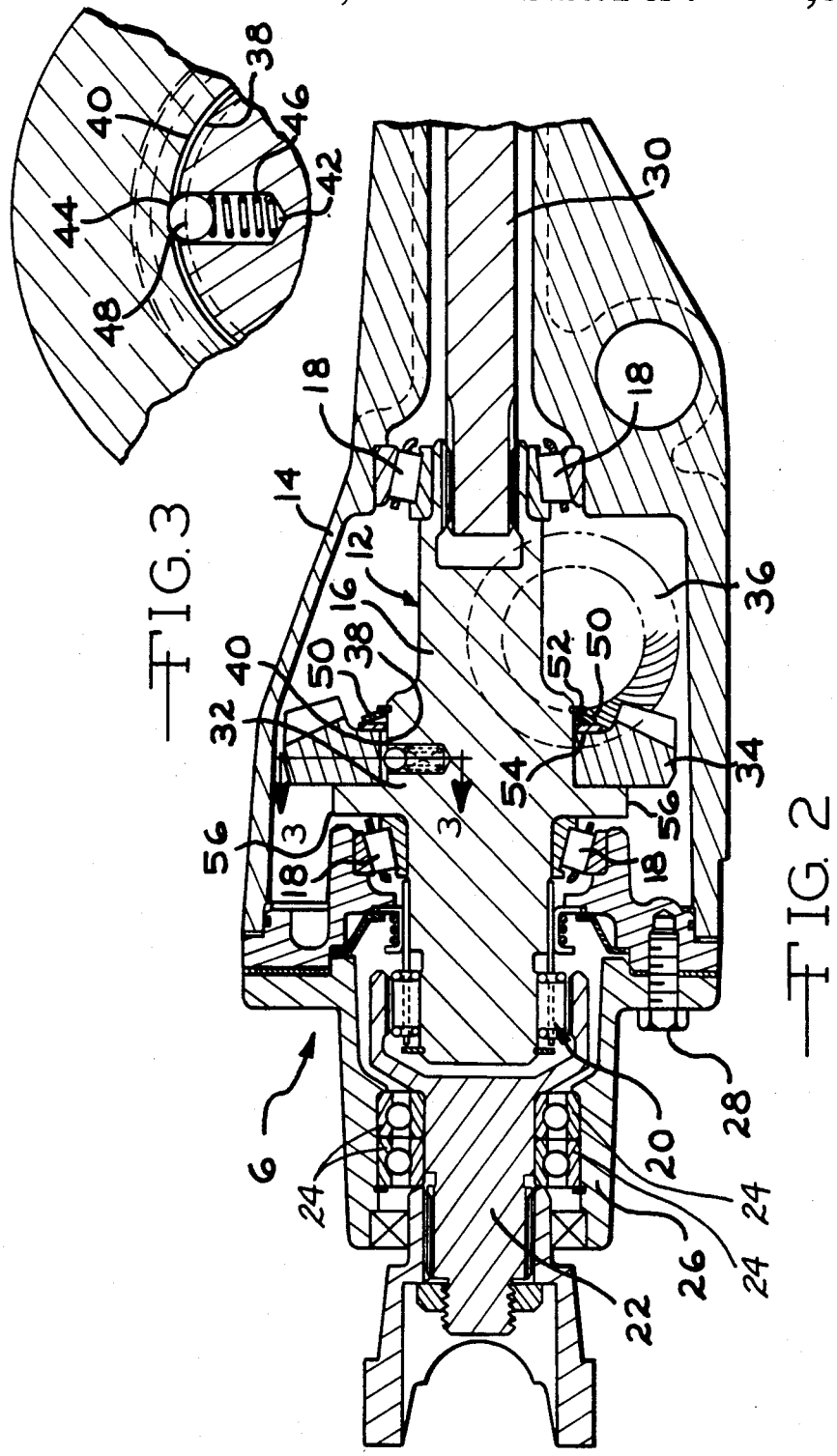

TORQUE LIMITING DEVICE

This invention relates to an improved torque transfer assembly for use with four-wheel drive vehicles having one set of primary drive wheels and a second set of auxiliary drive wheels which function to assist the primary drive wheels to enhance traction and handling. The use of four-wheel drive in off-the-road and utility-type vehicles is greatly preferred since slippage of the primary drive wheels will not necessarily result in loss of traction to the vehicle since the auxiliary drive wheels receive tractive torque and can continue tractive efforts.

Problems have been encountered, however, in supplying positive torque to four wheels when the vehicle is operating on non-slip surfaces such as the dry pavement of a highway. Vehicle steering geometry is such that the front wheels rotate faster than the rear wheels when the vehicle is negotiating turns on such non-slip surfaces. Further the wheels located on the outside radius of a turn must rotate at a faster rate than the wheels located on the inside radius of a turn. Such differences in rotation rate create excessive torque windup in the drive train of the four-wheel drive vehicles as well as problems with tire scuffing and overall handling of the vehicle. These problems created by irregular rotation rates, coupled with the incessant stresses imparted on the drive system of a four-wheel drive vehicle by the shock of having one or more of the four drive wheels jumping in and out of traction in an irregular manner as the vehicle moves over unstable terrain, makes it necessary to construct the drive system of the four-wheel drive vehicle out of large heavy-duty components. The use of heavy-duty drive train components is undesirable, however, since such large components add to the overall vehicle weight, take up excessive space, and reduce fuel mileage.

There have been many attempts to overcome the inherent problems of tire scuffing and excessive torque windup in four-wheel drive vehicles. For instance, differential systems have been included into the auxiliary drive axle or placed in interaxle relationships between the primary and auxiliary axle assemblies to allow overspeeding of one or more of the wheels during turns or on unstable terrain. However, this use of differentials provides somewhat undesirable results when one or more of the wheels loses traction and spins freely thus causing the differential to impart no driving torque to the other wheels. To remedy this problem, limited slip differentials, such as that system shown and described in U.S. Pat. No. 3,650,349, have been introduced.

The use of such differentials to cure the scuffing and torque windup problems is undesirable. The incorporation of extra differentials into the drive assembly creates unnecessary weight and problems with space design and utilization. Further, the use of such differentials creates added complexity to the maintenance and repairability of four-wheel drive systems.

The present invention is an improved torque transfer assembly, for use in a four-wheel drive vehicle, which is intended to reduce the shock loading on the auxiliary drive axle as the auxiliary drive wheels gain and lose traction during operation on unstable terrain. The torque transfer device of the present invention can be successfully combined with other drivetrain components to provide an economical, lightweight drive system for four-wheel drive vehicles, capable of tracting in unstable terrain and also capable of efficient highway travel. The present invention comprises the use of a unique gear assembly located in either the auxiliary drive axle assembly or the transfer case assembly for the auxiliary drive. The gear assembly includes a gear support having an outer circumference which mounts a gear having an inner circumference adjacent the outer circumference. A radially extending bore is located on one of the respective circumferences and a coincident detent is located on the remaining circumference. The bore contains a spring member. Positioned on the spring member is a ball member which seats into the detent under a force exerted by the spring member. The forces applied between the gear support and the gear by the spring and ball combination provide that the gear and gear support will rotate as one unit and transfer a portion of the desired resistive torque to the auxiliary drive wheels.

In the preferred form of the invention the gear is maintained in axial alignment with the gear support by at least one belleville spring that is mounted on the gear support and is compressed against the gear. The force which the belleville spring asserts against the gear combines with the forces applied by the ball and spring combination to the gear to transfer a cumulative resistive torque to the auxiliary drive wheels. Thus, the cumulative forces applied to the gear by the ball and spring combination and the belleville spring provide the desired resistive torque to the auxiliary drive assembly. The application of an overload torque greater than the resistive torque will force the gear to rotate relative to the gear support, thereby eliminating shock overloading of the auxiliary drive assembly.

The torque releasing gear of the present invention, therefore provides an economical, lightweight and highly reliable torque release device for four-wheel drive vehicles.

FIG. 2 is a partial cutaway view showing the present torque transfer assembly of the present invention used in combination with an overrunning clutch.

FIG. 3 is a cutaway view along line 3—3 of FIG. 2.

The present invention defines an improved torque transfer assembly which combines the use of a torque limiting gear receiving a cumulative resistance torque from forces applied by ball and spring combinations and belleville springs, to assist in reducing shock loading on the auxiliary drive axle of a four-wheel drive vehicle. The preferred embodiment of the present invention combines the use of this torque limiting gear with overrunning clutches adjacent the auxiliary wheels of the auxiliary drive axle assembly. Suitable gearing is arranged between the primary driven axle assembly and the auxiliary drive axle assembly, preferably through the transfer case, in such a manner to ensure that the auxiliary drive wheels will overrun the auxiliary drive member when the member is operated on non-slip surfaces. In this mode of operation, the vehicle will behave as a conventional two-wheel drive vehicles even though the auxiliary drive axle assembly is being motored and is ready to transmit driving force when road conditions dictate.

When the vehicle encounters road conditions that cause the primary driven wheels to slip, the motoring auxiliary drive axle assembly overtakes the overrunning auxiliary drive wheels and transmits driving force through them. The preferred embodiment of this invention includes no differential between the auxiliary drive wheels. Thus, the well-known problems associated with wheel spin-out are avoided. The overrunning clutches perform the necessary function of the differential by allowing the wheels to vary in rotational speed as the vehicle corners. The improved drive gear torque limiting device of the present invention is combined with this axle assembly in the preferred use to assist in eliminating heavy shock loading and torque overloading and drivetrain windup during periods when the auxiliary drive wheels are receiving drive torque and operating in a tractive mode. The torque release gear of the present invention satisfies the objectives by providing for significant reductions in drivetrain component sizing, thereby creating more lightweight axle assemblies and more efficient space utilization for four-wheel drive vehicles. Increases in fuel consumption also result from this invention.

Figure 1:
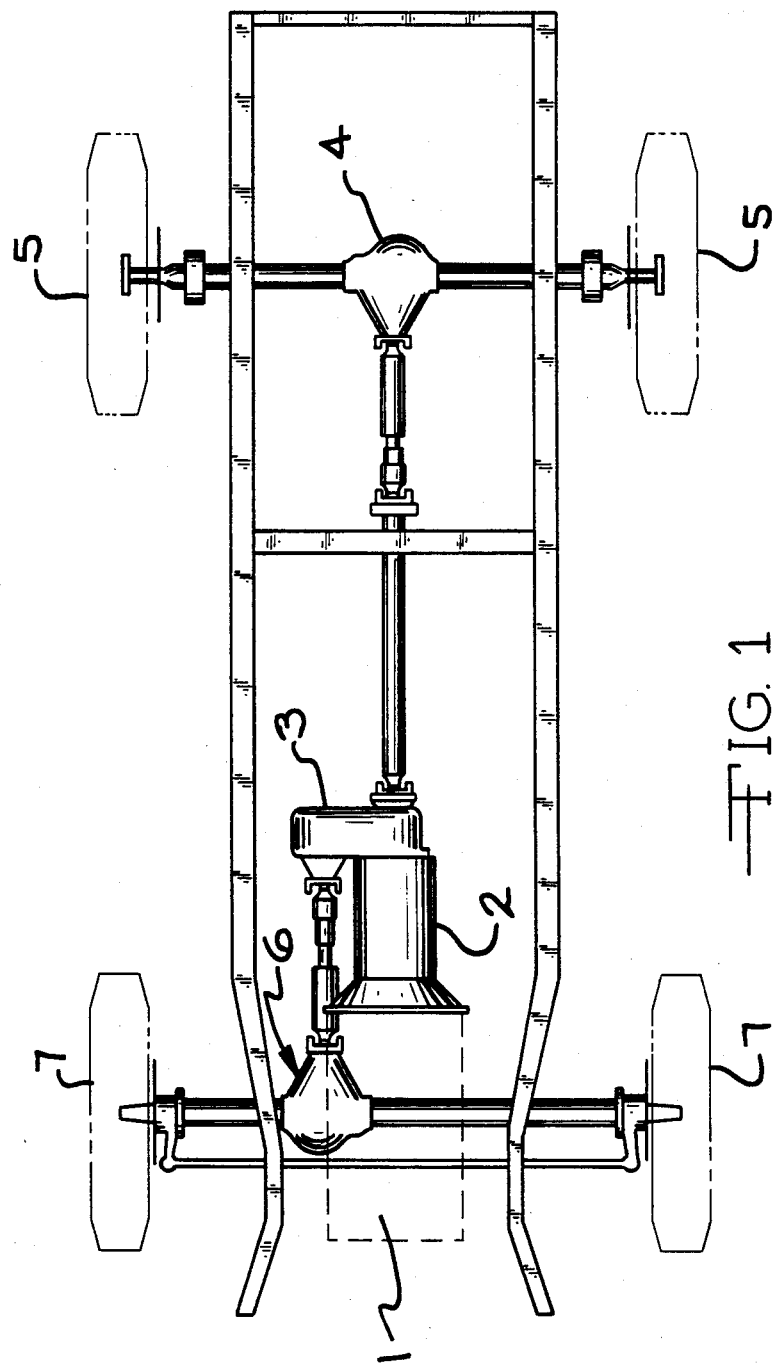
FIG. 1 is a top view of a vehicle frame showing the prime mover, transmission, transfer case, primary driven axle assembly and wheels, and auxiliary drive axle assembly and wheels.

Referring now to FIG. 1, a basic drivetrain layout for a four-wheel drive vehicle is shown. The vehicle of FIG. 1 has a prime mover 1, a transmission 2, a transfer case 3, a rear primary driven axle assembly 4 with two primary driven wheels 5, and a front auxiliary drive axle assembly 6 with two auxiliary drive wheels 7. It is recognized, of course, that design considerations may dictate that the primary driven axle assembly 4 and primary driven wheels 5 be located in the front of the vehicle with the auxiliary drive axle assembly 6 and auxiliary drive wheels located at the rear of the vehicle. The present invention is adaptable for use in either mode.

Referring now to FIG. 2, the torque limiting gear assembly of the present invention will be described. The auxiliary drive axle assembly 6 is disclosed having an axle shaft assembly 12 housed within a cover 14. The axle shaft assembly 12, as shown in FIG. 1, includes a first shaft member 16 seated in the cover 14 on roller bearings 18. Located at one end of the first shaft member 16 is an overrunning clutch member 20. The overrunning clutch member 20 engages the first shaft member 16 with the outside axle 22 which is seated in bearings 24 located in the axle retainer 26. The axle retainer 26 is fixed to the cover assembly 14 with a plurality of bolts 28. Splined to the opposed end of the first shaft member 16, in this particular embodiment, is a second shaft member 30 which extends to a second overrunning clutch member (not shown) and second outside axle assembly (not shown), which are similar to the overrunning clutch member 20 and outside axle assembly 22. Of course, the preferred embodiment of the invention may be adapted for use with other axle assembly designs, such as solid axles, axles incorporating no use of overrunning clutches, axles incorporating differentials, semi-float tapered shaft axles, full-float axles, and semi-float flange shaft axles.

Referring now to FIGS. 2 and 3, the preferred embodiment of the present invention will be fully described in detail. Positioned on the first shaft member 16 is a ring gear support 32 upon which a ring gear 34 is mounted. The ring gear 34 engages pinion gear 36 which is in communication with the transfer case 3 of the vehicle. The ring gear support 32 has an outer circumference 38 and the ring gear 34 has an inner circumference 40 adjacent the outer circumference 38. A plurality of radially extending bores 42 are located at angularly spaced intervals along the outer circumference 38 of the ring gear support 32. The number of bores 42 is dictated by design considerations. For instance, the greater the desired torque resistance of the ring gear 34, the greater the number of bores 42. A plurality of detents 44 are located in the inner circumference 40 of the ring gear 34 at spaced intervals which are coincident with the bores 42. Located in each bore 42 is a spring member 46 and a ball member 48 which is engaged by the spring member 46 and forced into the detent 44. The force with which the spring member 46 asserts the ball member 48 against the detent 44 of the ring gear 34 affects the amount of torque resistance the ring gear 34 will provide. The greater the number of bores and detents containing spring 46 and ball 48 combinations will directly affect the amount of torque resistance desired of the ring gear 34.

The ring gear 34 is held in axial alignment with the ring gear support 32 by at least one belleville spring 50. The belleville spring 50 is retained on the first shaft member 16 by a snap ring 52. The belleville spring 50 is flexed against a washer 54 which engages the ring gear 34, thereby exerting force against the washer 54 and the ring gear 34. The ring gear 34 abuts a shoulder 56 which is integral with the ring gear support 32. Thus, the force exerted by the belleville spring 50 against the washer 54 maintains the ring gear 34 in an abutted positioned with shoulder 56 and therefore maintains axial alignment of the ring gear 34 with the ring gear support 32.

The force exerted by the flexed belleville spring 50 between the snap ring 52 and washer 54 abutting the ring gear 34 provides additional resistance torque which is cumulative to the resistence torque provided by the spring 46 and ball 48 combinations. It is preferable that the cumulative resistance torque provided by the belleville spring provide a rather substantial amount of the total desired resistance torque. In some cases the belleville resistance torque may be as high as 50% of the total desired torque. Since the belleville spring 50 tends to exert a continuous circumference of force against the ring gear 34, it has been found that the torque transfer assembly of this invention operates smoothly and with great dependability.

In operation, the preferred embodiment of the present invention operates as follows. The primary driven axle assembly 4 and the auxiliary drive axle assembly 6 as shown in FIG. 1 are geared together in the transfer case 3 in such a manner as to ensure that the auxiliary drive axle assembly 6 rotates at a slightly slower rate than the primary driven wheels 5. Thus, when the vehicle is operated on a non-slip surface, such as a dry pavement highway, the auxiliary drive wheels 7 will rotate at a rate faster than the first shaft member 16 of the auxiliary drive axle assembly 6. Thus, the auxiliary drive wheels 7 will overrun the first shaft member 16 through the overrunning clutch member 20. In this mode of operation, the four-wheel drive vehicle will behave as a conventional two-wheel drive vehicle even though the auxiliary drive axle assembly 6 is being motored and is ready to transmit driving torque when conditions dictate.

When the vehicle encounters road conditions that cause the primary driven wheels 5 to slip, the rotating first shaft member 16 overtakes the rotation of the overrunning auxiliary drive wheels 7 engages the overrunning clutch member 20 and begins to transmit driving torque to the auxiliary drive wheels 7. The embodiment of the auxiliary drive axle assembly of FIG. 2 is devoid of a differential thereby avoiding any spinout problems.

The present invention prevents excessive torque overload and transmission of heavy shock loads through the drive system of the vehicle and excessive torque windup in the drivetrain of the vehicle. When the torque transmitted through the auxiliary drive wheels 7 overloads the desired torque load at the ring gear 34 as provided through the cumulative effects of the spring members 46, ball members 48 and belleville spring 50, (i.e., when one of the auxiliary drive wheels jams between two rocks) the ring gear 34 will slip relative to the ring gear support 32 by forcing the ball members 48 against the spring members 46 into the bores 42. This slippage will continue until the torque overload conditions become less than the desired torque output as dictated by the forces of the spring members 46, ball members 48 and the belleville spring 50. Thus, it can be seen that the drive system components can be reduced in size and weight, thereby decreasing overall vehicle weight, increasing space utilization, and increasing fuel consumption through the use of the torque limiting device of the present invention.

Figure 4:
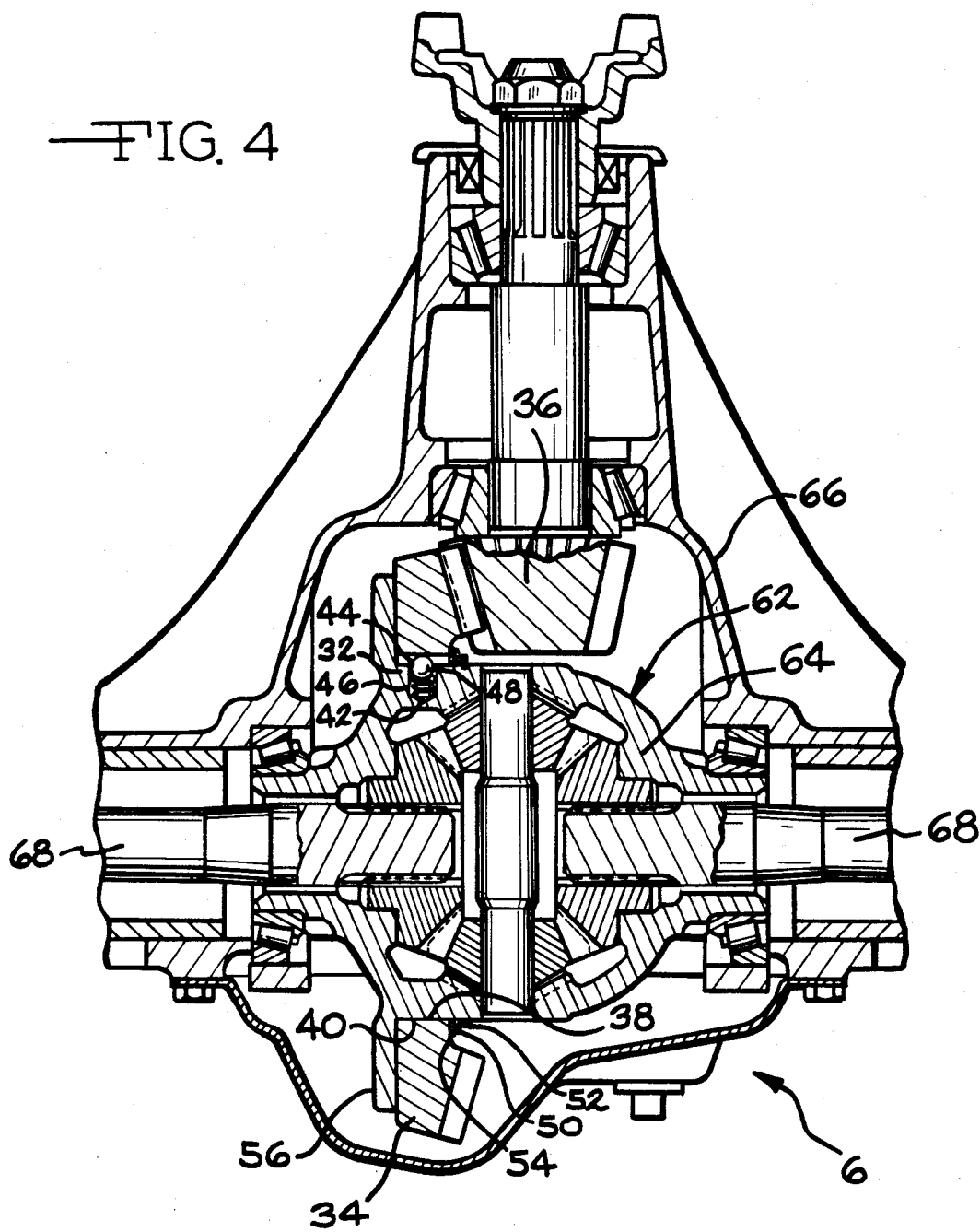
FIG. 4 is a partial cutaway view showning the torque transfer assembly of the present invention used in combination with a differential axle assembly.

Referring now to FIG. 4, an alternative adaptation of the present invention is shown as applied to an axle assembly 6 which includes a differential 62 housed in a differential casing 64 within the cover 66. Splined to the differential are opposed axle shafts 68 which extend to the auxiliary drive wheels 7.

The ring gear support 32 of the invention is disposed on the differential casing 64. The ring gear 34 is mounted on the ring gear support 32 and abuts the shoulder 56 which is integral with the ring gear support 32. The ring gear 32 engages pinion gear 36 and receives driving torque from the pinion gear 36 which is in communication with the transfer case 3 of the vehicle. The ring gear support 32 has an outer circumference 38 and the ring gear 34 has an inner circumference 40 adjacent the outer circumference 38. A plurality of radially extending bores 42 are located at angularly spaced intervals along the outer circumference 38 of the ring gear support 32. A plurality of detents 44 are located in the inner circumference 40 of the ring gear 34 at spaced intervals which are coincident with the bores 42. Located in each bore 42 is a spring member 46 and a ball member 48 which is engaged by the spring member 46 when forced into the detent 44.

The ring gear 34 is held in axial alignment with the ring gear support 32 by at least one belleville spring 50. The belleville spring 50 is retained on the differential casing 64 by a snap ring 52. The belleville spring 50 is flexed against a washer 54 which engages the ring gear 34, thereby exerting force against the washer 54 and the ring gear 34. The force exerted by the belleville spring 50 against the washer 54 maintains the ring gear 34 in an abutted position with the shoulder 56.

Figure 5:
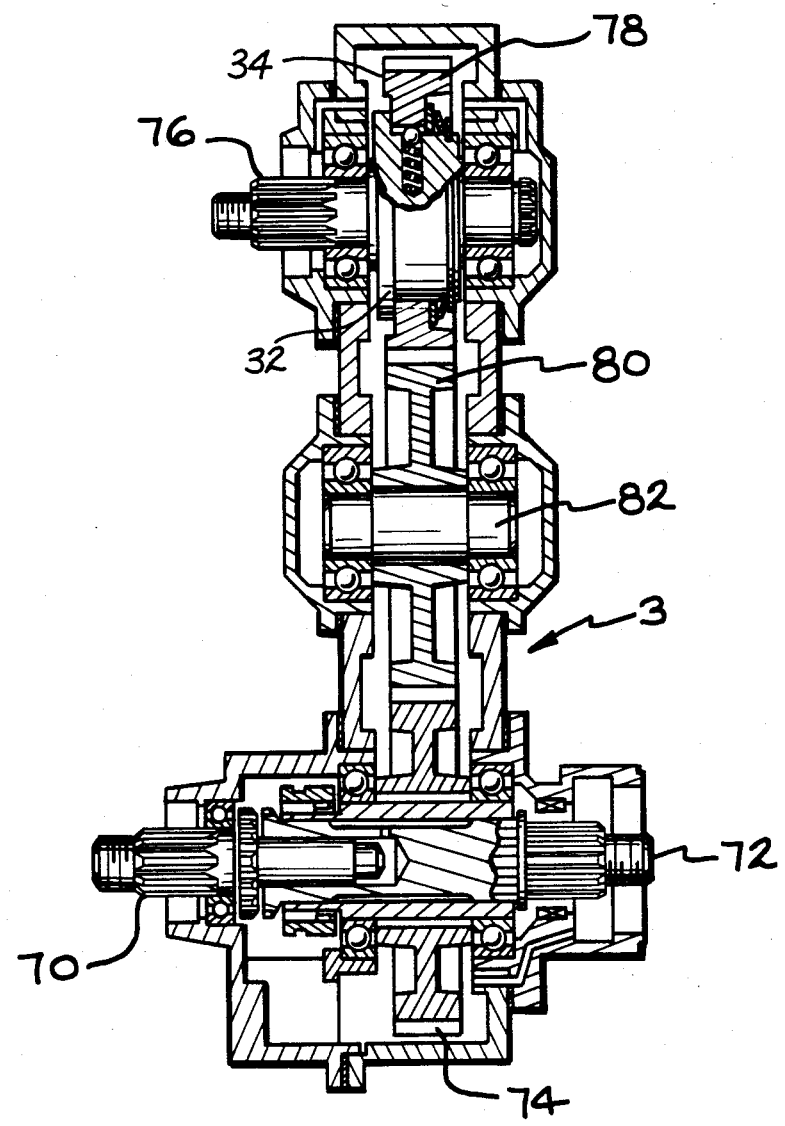
FIG. 5 is a partial cutaway view showing the torque transfer assembly of the present invention as used in a transfer case.

Referring now to FIG. 5, a second alternative adaptation of the present invention is shown as applied to a transfer case 3 which includes an input shaft 70, a primary output shaft 72 engaged with the input shaft 70, and a first transfer member 74 in communication with the primary output shaft 72 and input shaft 70. An auxiliary output shaft 76 having a second transfer member 78 is spaced from the input shaft 70, primary output shaft 72 and first transfer member 74. Disposed between the auxiliary output shaft 76, second transfer member 78 and the input shaft 70, primary output shaft 72 and first transfer member 74 is an intermediate transfer member 80 mounted on intermediate shaft 82. The present invention is incorporated within the auxiliary output shaft 76 and second transfer member 78.

Positioned on the auxiliary output shaft 76 is the ring gear support 32 upon which the ring gear 34 is mounted. The remaining structure of the present invention is identical to the structure which has been fully described with reference to FIGS. 2, 3, and 4.

In operation, the preferred embodiment of this invention will prevent transmission of excessive torque overload, heavy shock loads, and excessive torque windup through the transfer case 3 to the primary output shaft 72 or input shaft 70. Upon application of such torque overloads, etc., will cause the second transfer member 78 to rotate relative to the auxiliary output shaft 76, thereby preventing damage to the primary output shaft 72 and input shaft 70 of the transfer case 3.

The description of the preferred embodiment of the torque transfer device of the present invention has been related herein showing three specific adaptations in four-wheel drive vehicles. It is intended that these specific adaptations be construed as explanatory in nature and are not intended to be limiting upon the breadth and scope of the present invention as claimed.

I claim:

1. An improved torque transfer assembly for use in a vehicle having a prime mover, a transmission and a transfer case interconnecting a primary driven axle assembly and an auxiliary drive axle assembly, said auxiliary drive axle assembly including a torque transfer means positioned between two opposed auxiliary drive wheels, said torque transfer means includes an input pinion gear in communication with said transfer case, shaft means between said two opposed auxiliary drive wheels including a gear support means for mounting a ring gear engaged with said input pinion gear, said ring gear support means having an outer circumference for rotation with said shaft means, said ring gear having an inner circumference adjacent said outer circumference of said support means, said support means or said ring gear defining a radially extending bore on a respective circumference and said ring gear or said support means having a detent located coincident with said bore on a respective circumference, a spring positioned in said bore, and a ball member positioned with said spring located in said bore, said spring biasing said ball member into engagement with said detent with a force determined to engage said ring gear with said support means for rotation with said shaft means and said auxiliary drive wheels, said torque transfer assembly further including a belleville spring positioned on said shaft means, said belleville spring being engaged with said ring gear and applying a second force thereto, said belleville spring maintaining said ring gear in axial alignment with said gear support means, such second force being cumulative with such first force of engagement between said ring gear and said support means, thereby transferring cumulative drive torque from said pinion gear to said auxilliary drive wheels, whereby upon application of an overload torque greater than such desired torque combination from said spring and ball member and said belleville spring said ring gear rotates relative to said gear support means, thereby eliminating drive torque transfer from said input pinion gear to said auxiliary drive wheels.

2. The torque transfer assembly of claim 1, wherein said ring gear or support means defines a plurality of radially extending bores located at angularly spaced intervals along a respective circumference and said ring gear or support means includes a plurality of detents located at angularly spaced intervals coincident with said plurality of bores on a respective circumference, a plurality of springs located in said plurality of radially extending bores, each of said springs positioned in one of said bores, and a plurality of ball members positioned with said springs located in said bores, said springs biasing said ball members into engagement with said detents.

3. The torque transfer assembly of claim 1, wherein said torque transfer means further includes a differential means, said differential means having a differential case with said gear support means for mounting said gear disposed thereon and said belleville spring positioned thereon, said shaft means including a first shaft member positioned between said differential means and one of said auxiliary drive wheels and a second shaft member opposed to said first shaft member and positioned between said differential means and said remaining auxiliary drive wheel.

4. An improved torque transfer assembly for use in a vehicle having a prime mover, a transmission, and a transfer case interconnecting a primary driven axle assembly and an auxiliary drive axle assembly, said transfer case including an input shaft member in communication with said transmission and a primary output drive shaft engaged with said input shaft member, said primary output drive shaft being in communication with said primary driven axle assembly, an auxiliary output drive shaft engaged with said input shaft member or said primary output drive shaft, said auxiliary output drive shaft being in communication with said auxiliary drive axle assembly, said auxiliary output drive shaft including a gear support means for mounting a gear engaged with said input shaft member or said primary output drive shaft, said gear support means having an outer circumference for rotation with said auxiliary output drive shaft, said gear having an inner circumference adjacent said outer circumference of said support means, said support means or said gear defining a plurality of radially extending bores located at angularly spaced intervals along a respective circumference and said gear or support means having a plurality of detents located at angularly spaced intervals coincident with said plurality of bores on a respective circumference, a plurality of springs located in said plurality of radially extending bores, each of said springs positioned in each of said bores, a plurality of ball members positioned with said springs located in said bores, said springs biasing said ball members into engagement with said detents with a force determined to engage said gear with said gear support means for rotation with said auxiliary output drive shaft, whereby such force of engagement between said gear and said support means transfers a portion of the desired drive torque from said input shaft member or said primary output drive shaft to said auxiliary drive axle assembly, and resilient means positioned on said auxiliary output drive shaft, said resilient means being engaged with said gear and applying a second force thereto, said resilient means maintaining said gear in axial alignment with said gear support means, such second force being cumulative with such first force of engagement between said gear and said support means, thereby transferring cumulative drive torque from said input shaft member or said primary output drive shaft to said auxiliary drive axle assembly, whereby upon application of an overload torque greater than such desired torque combination from said springs and ball members and said resilient means said gear rotates relative to said gear support means, thereby eliminating drive torque transfer from said input shaft member or said primary output drive shaft to said auxiliary drive axle assembly.

5. The torque transfer assembly of claim 4, wherein said resilient means includes at least one belleville spring positioned on said auxiliary output drive shaft and engaged with said gear.

6. An improved torque transfer assembly for use in a vehicle having prime mover, a transmission, and a transfer case interconnecting a primary driven axle assembly and an auxiliary drive axle assembly, said transfer case including an input shaft member in communication with said transmission and a primary output drive shaft engaged with said input shaft member, said primary output drive shaft being in communication with said primary driven axle assembly, and an auxiliary output drive shaft in communication with said input shaft member or said primary output drive shaft, said auxiliary output drive shaft also being in communication with said auxiliary drive axle assembly, said auxiliary output drive shaft including a gear support means for mounting a gear engaged with said input shaft member or said primary output drive shaft, said gear support means having an outer circumference for rotation with said auxiliary output drive shaft said gear having an inner circumference adjacent with said outer circumference of said support means, said support means or said gear defining a plurality of radially extending bores located at angularly spaced intervals along a respective circumference and said gear or support means having a plurality of detents located at angularly spaced intervals coincident with said plurality of bores on a respective circumference, a plurality of springs located in said plurality of radially extending bores, each of said springs positioned in each of said bores, a plurality of ball members positioned with said springs located in said bores, said springs biasing said ball members into engagement with said detents with a force determined to engage said gear with said gear support means for rotation with said auxiliary output drive shaft, whereby such force of engagement between said gear and said support means transfers a portion of the desired drive torque from said input shaft member or said primary output drive shaft to said auxiliary output drive shaft, and resilient means positioned on said auxiliary output drive shaft, said resilient means being engaged with said gear and applying a second force thereto, said resilient means maintaining said gear in axial alignment with said gear support means, such second force being cumulative with such first force of engagement between said gear and said support means, thereby transferring cumulative drive torque from said input shaft member or said primary output drive shaft to said auxiliary output drive shaft, whereby upon application of an overload torque greater than such torque combination from said springs and ball members and said resilient means said gear rotates relative to said gear support means, thereby eliminating drive torque transfer from said input shaft member or said primary output drive shaft to said auxiliary output drive shaft.

7. The torque transfer assembly of claim 6, wherein said resilient means includes at least one belleville spring positioned on said auxiliary output drive shaft and engaged with said gear.

8. An improved torque transfer assembly for use in a vehicle having a prime mover, a transmission, a primary driven axle assembly, an auxiliary drive assembly, and a torque transfer means in communication with said primry driven axle assembly and said auxiliary drive axle assembly, said torque transfer means including a gear support means for mounting a gear in communication with said primary driven axle assembly, said gear support means having an outer circumference, said gear having an inner circumference adjacent said outer circumference of said gear support means, said gear support means or said gear defining a radially extending bore on a respective circumference and said gear or said gear support means having a detent located coincident with said bore on said circumference, a spring positioned in said bore, and a ball member positioned with said spring biasing said ball member into engagement with said detent with a force determined to engage said gear with said gear support means for rotation, whereby such force of engagement between said gear and said gear support means transfers the desired drive torque from said primary driven axle assembly to said auxiliary drive axle assembly, said torque transfer assembly further including a resilient means positioned on said gear support means, said resilient means being engaged with said gear and applying a second force thereto, said resilient means maintaining said gear in axial alignment with said gear support means, said second force being cumulative with such first force of engagement between said gear and said gear support means, thereby transferring cumulative drive torque from said primary driven axle assembly to said auxiliary drive axle assembly, whereby upon application of an overload torque greater than such desired torque combination from said spring and ball member and said resilient means said gear rotates relative to said gear support means, thereby eliminating drive torque transfer from said primary driven axle assembly to said auxiliary drive axle assembly.

9. An improved torque transfer assembly for use in a vehicle having a prime mover, a transmission, and a transfer case interconnecting a primary drive axle assembly and an auxiliary drive axle assembly, said auxiliary drive axle assembly including a torque transfer means positioned between two opposed auxiliary drive wheels, said torque transfer means including an input pinion gear in communication with said transfer case, shaft means between said two opposed auxiliary drive wheels, said shaft means including a plurality of shaft members operatively connected to said auxiliary drive wheels, said shaft means further including an overrunning clutch means adjacent each auxiliary drive wheel, said overrunning clutch means automatically disengaging said respective auxiliary drive wheel from said respective shaft member when the rotational speed of said auxiliary drive wheel exceeds the rotational speed of said respective shaft member whereby said disengaged auxiliary drive wheels freely rotates about said respective shaft member, said overrunning clutch means automatically engaging said respective shaft member and said auxiliary drive wheel when the rotational speed of said auxiliary drive wheel is less than the rotational speed of said respective shaft member, whereby said auxiliary drive wheel is driven by said respective rotating shaft member, said shaft means further including a gear support means for mounting a ring gear engaged with said input pinion gear, said ring gear support means having an outer circumference for rotation with said shaft means, said ring gear having an inner circumference adjacent said outer circumference of said support means, said support means or said ring gear defining at least one radially extending bore on a respective circumference and said support means or said ring gear having a detent located coincident with said bore on a respective circumference, a spring positioned in said bore, and a ball member positioned with said spring located in said bore, said spring biasing said ball member into engagement with said detent with a force determined to engage said ring gear with said support means for rotation with said shaft means and said auxiliary wheels, whereby said force of engagement between said ring gear and said support means transfers the desired drive torque from said input pinion gear to said auxiliary drive wheels, said torque transfer assembly further including a belleville spring positioned on said shaft means, said belleville spring being engaged with said ring gear in applying a second force thereto, said belleville spring maintaining said ring gear in axial alignment with said gear support means, such second force being cumulative with such first force of engagement between said ring gear and said support means, thereby transferring cumulative drive torque from said input pinion gear to said auxiliary drive gears, whereby upon application of an overload torque greater than such desired torque combination from said spring and ball member and said belleville spring said ring gear rotates relative to said gear support means, thereby eliminating drive torque transfer from said input pinion gear to said auxiliary drive wheels.

* * * * *